J. S. KIRFMAN.
TREE PROTECTING DEVICE.
APPLICATION FILED OCT. 9, 1916.
1,235,520.
Patented July 31, 1917.
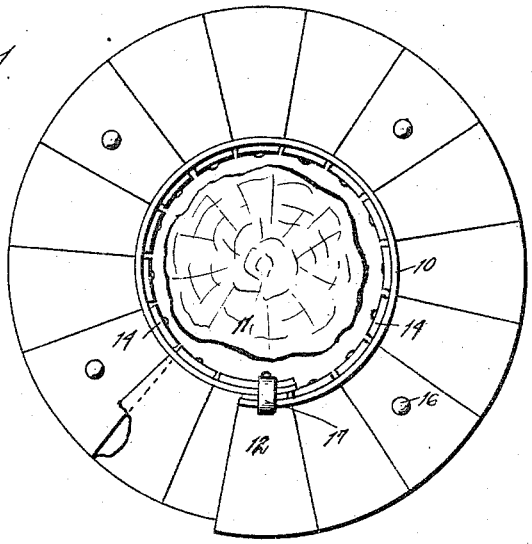
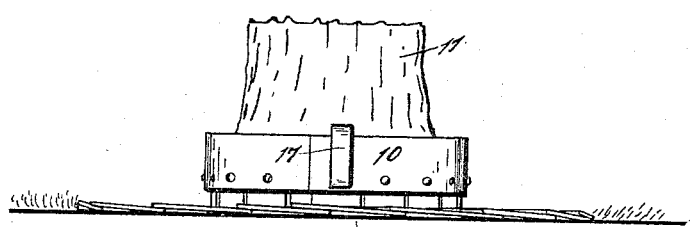
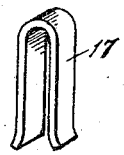
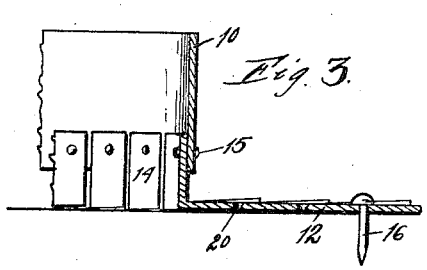
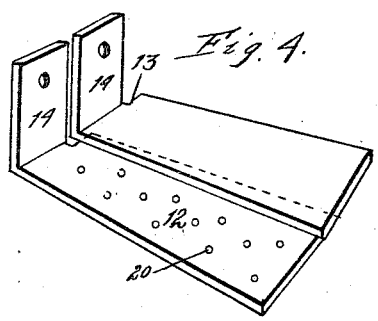
Witness.
G. F. Turechek.
Inventor.
John S. Kirfman
By Orwig & Bair
Attys.

UNITED STATES PATENT OFFICE.

JOHN SAMUEL KIRFMAN, OF DES MOINES, IOWA.

TREE-PROTECTING DEVICE.

1,235,520.  Specification of Letters Patent.  Patented July 31, 1917.

Application filed October 9, 1916. Serial No. 124,516.

*To all whom it may concern:*

Be it known that I, JOHN SAMUEL KIRFMAN, a citizen of the United States, and resident of Des Moines, in the county of Polk and State of Iowa, have invented a certain new and useful Tree-Protecting Device, of which the following is a specification.

My invention relates to a device for protecting the lower parts of the trunks of trees.

It is my object to provide such a device capable of adjustment to fit trees of different sizes, having an adjustable ring or band surrounding the tree trunk, and to provide laterally extending means, adapted to rest flat on the ground, which will prevent access to the roots of the trees near the tree trunk, and will prevent grass from growing in a small circle around the tree and will permit a mower to travel over said means for cutting the grass close thereto.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a horizontal, sectional view of a tree trunk equipped with a tree protecting device embodying my invention, which device is shown in a top or plan view.

Fig. 2 shows a side elevation of the device shown in Fig. 1.

Fig. 3 shows a vertical, sectional view of part of my device taken on the line 3—3 of Fig. 1.

Fig. 4 shows a perspective view of two of the plates which forms a flat ring around the broken band, and Fig. 5 shows a perspective view of the spring clip which holds together the overlapping ends of the broken band.

In the accompanying drawings, illustrating one form of my invention, I have used the reference numeral 10 to indicate a broken, resilient band, which may be of any desired substantial width from top to bottom and is designed to encircle a tree trunk 11.

The ends of the bands 10 are designed to overlap each other, as clearly shown in Fig. 1.

In connection with the broken band 10, I provide a flat protecting ring at the lower end of said broken band, comprising a plurality of substantially horizontal plates 12. The plates 12 are preferably tapered somewhat from their outer to their inner ends, as clearly shown in Fig. 1, and are secured to the lower portion of the broken band 10 in the following manner.

At the inner end of each plate 11 a portion of the end is cut away to form a notch 13 at one side edge of said inner end of the plate 12. At the inner end of the plate 12 is an upwardly extending flange or supporting member 14, which extends from the notch 13 to the edge of the plate 12 opposite the notch 13, as shown in Fig. 4.

The upper ends of the flanges 14 are secured to the lower portion of the band 10 in spaced succession around said band. The flanges 14 may be secured to the band 10 by means of bolts 15, or any other suitable means.

The plates 12 and the flanges 14 are so arranged and so connected with the broken band 10, that the plates 12 are arranged in succession around the band 10 with their adjacent edges overlapping.

The edge of each plate 12, from which the notch 13 has been cut, is arranged below the adjacent edge of the next successive plate 12, so as to allow some play of the plates when the broken band 10 is expanded or contracted.

It will thus be seen that the plate 12 varies slightly from the horizontal, and that during expanding or contracting movement of the band 10, the plates slide on each other somewhat similarly to the leaves of a folding fan. Part of the plates 12 are preferably provided with downwardly extending members 16 which can be forced into the ground when the device is assembled on a tree, so that the plates 12 will not thereafter be moved accidentally, and also to prevent the flange 10 from being driven or knocked against the tree.

The overlapping ends of the band 10 are preferably secured together after the device has been installed on a tree by means of a spring clip 17, shown in Fig. 5.

In the practical use of my improved tree protecting device, the broken band is expanded until the ends thereof, are separated sufficiently to permit the band to be extended around the tree, whereupon the resiliency of the band will automatically cause it to contract. The ends of the band 10 may then be made to overlap each other the proper distance for making the band reasonably close to the tree.

I prefer to leave a slight space between the band 10 and the tree 11. The clip 17 is then installed in position. The entire device is then slid downwardly, until the members 16 enter the ground.

It will be seen that the band 10 may be of any desired height, and that it serves to protect the tree against small animals, and against being hit by a lawn mower or the like.

On a well-kept lawn it is necessary to cut the grass close to the trees, and this is usually done, as far as possible, by means of a lawn mower. The use of the lawn mower close to the trees frequently results in the trees being struck and bumped by the lawn mower. This difficulty I entirely avoid by the use of my device. Even where a lawn mower is used, it is necessary in addition to the use of a lawn mower to use a spade or some other means for cutting the grass close in to the tree trunk. Where my device is used, the plates 12 prevent the growth of grass close to the tree-trunk and also prevent the appearance of a ragged collar of grass around the tree.

The members 16 secure the plates 12 and the band 10 in position around the tree, so that even if the band 10 is struck by a lawn mower or the like, it will be held against movement against the tree.

On account of the adjustability of my improved device, it can be manufactured in a comparatively few standard sizes, and each size can be adjusted to fit trees of considerably varying diameters.

A difficult problem is involved in making the resilient ring adjustable and connecting therewith the plates 12 to form a continuous horizontal ring. This I have solved by the peculiar construction of the plate 12 and the flanges 14, and at all times where my device is used, the plates 12 overlap each other to form a continuous ring.

Some changes may be made in the construction and arrangement of the parts of my device, without departing from the essential features and purposes thereof, and it is my intent to cover by this application any such changes which may be included within the scope of my claims.

In this connection it may be mentioned that the plates 12 may be provided with a plurality of comparatively small openings 20, preferably tapered from their upper to their lower ends to permit moisture to pass through the plates 12 to the ground beneath them.

On account of the slight inclination of the plates from side to side some water will pass between them, and the further fact that water will pass down the tree trunk inside the collar or opening 10 to the roots of the tree.

If certain kinds of grass or other growths of the vine families should tend to run over the upper surface of the plates 12 inwardly from the outer edges, the user of my device can simply raise the entire device and let the grass or the vine or the like drop to the ground beneath the plates 12, and thereupon the further growth of said vine or the like over the plates 12 will be prevented. I do not intend to confine the use of my device to trees, but will use it for protecting shrubs, bushes and other growing things for which it is adaptable. The plates 12 lie close to the ground so that the lawn mower will easily run over them for cutting the grass without leaving a fringe.

It is my purpose to paint my device in such colors as will harmonize with the trees or shrubbery and the lawn.

The spring clip 17 may be riveted to the inner overlapping edge of the band 10, as shown in Fig. 1, so that there are no loose parts belonging to my protector.

I claim as my invention—

1. A tree protecting device comprising a band, a plurality of radially projecting plates secured to said band at the lower edge thereof, arranged to successively overlap each other, and to rest close to the ground to permit a lawn mower to run over them.

2. A tree protecting device comprising a band, a plurality of radially projecting plates secured to said band at the lower edge thereof, arranged to successively overlap each other, and to rest close to the ground to permit a lawn mower to run over them, and means adapted to enter the ground to prevent horizontal movement of said device.

3. A tree protecting device comprising an adjustable band, capable of expansion and contraction to different positions of its adjustment, and a plurality of substantially horizontal plates extending radially away from the lower edge of said band, arranged to overlap each other in succession around the band, each plate having a notch at its inner end, near one side edge for receiving the side edge of an adjacent plate to permit sliding, overlapping movement of the plates, and an upwardly extending flange extending from said notch to the opposite side edge of the plate, said flanges being secured to said band, said plates being slightly inclined from the horizontal, but being adapted to be close to the ground, to permit a lawn mower to pass over them.

Des Moines, Iowa, September 11, 1916.

JOHN SAMUEL KIRFMAN.